United States Patent
Steber et al.

(10) Patent No.: US 9,591,595 B2
(45) Date of Patent: Mar. 7, 2017

(54) INROUTE AUTOMATIC GAIN CONTROL DETECTION OF OUTROUTE INTERFERENCE

(71) Applicant: Hughes Network Systems, LLC, Germantown, MD (US)

(72) Inventors: J. Mark Steber, Frederick, MD (US); Yogesh Sethi, Boyds, MD (US); Walter Robert Kepley, III, Gaithersburg, MD (US); Dan Hantz, Germantown, MD (US); Nimesh Ambeskar, Germantown, MD (US); Hanhui Zhang, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 207 days.

(21) Appl. No.: 14/501,622

(22) Filed: Sep. 30, 2014

(65) Prior Publication Data
US 2016/0095073 A1  Mar. 31, 2016

(51) Int. Cl.
*H04B 15/00* (2006.01)
*H04B 7/185* (2006.01)
(Continued)

(52) U.S. Cl.
CPC ............ *H04W 52/52* (2013.01); *H04B 7/185* (2013.01); *H04B 15/00* (2013.01); *H04B 1/001* (2013.01)

(58) Field of Classification Search
None
See application file for complete search history.

(56) References Cited

U.S. PATENT DOCUMENTS

| 6,374,096 B1 * | 4/2002 | Parr ..................... H04W 52/24 342/359 |
| 6,675,125 B2 * | 1/2004 | Bizjak .................. H03G 3/3089 333/14 |

(Continued)

OTHER PUBLICATIONS

International Search Report from corresponding WO application PCT/US2015/052679.

*Primary Examiner* — Ayaz Sheikh
*Assistant Examiner* — Tarell Hampton
(74) *Attorney, Agent, or Firm* — Edell, Shapiro & Finnan LLC; Richard C. Irving

(57) ABSTRACT

A method and a satellite gateway for minimizing an impact of a noise floor variation in a spot beam satellite system. A demodulator processes digitized signals from multiple channels. Digitized signals are automatically gain controlled by respective automatic gain control components associated with respective channels. Automatic gain controlled digitized signals are downconverted and provided to a burst processor. The burst processor processes each downconverted signal and provides, with respect to each downconverted signal, an automatic gain control estimate, a code rate, and an inroute number to a processor component. The processor component determines an average automatic gain control value for each inroute, provides automatic gain control references to the respective automatic gain control components, and periodically sends noise map information to satellite terminals served by the satellite gateway. In some embodiments, the automatic gain control values are biased according to corresponding code rates.

16 Claims, 9 Drawing Sheets

(51) Int. Cl.
*H04W 52/52* (2009.01)
*H04B 1/00* (2006.01)

(56) References Cited

U.S. PATENT DOCUMENTS

| | | | |
|---|---|---|---|
| 8,831,121 B1* | 9/2014 | Qi | H04L 27/2653 375/260 |
| 2003/0128671 A1* | 7/2003 | Niesen | H04B 7/18508 370/313 |
| 2004/0100941 A1* | 5/2004 | Lim | H04B 7/1858 370/349 |
| 2005/0207386 A1* | 9/2005 | Schiff | H04B 7/1858 370/345 |
| 2007/0109955 A1* | 5/2007 | Moorti | H03G 3/3042 370/206 |
| 2007/0155316 A1 | 7/2007 | Monte et al. | |
| 2007/0168827 A1* | 7/2007 | Lohr | H04L 1/1845 714/749 |
| 2007/0217355 A1* | 9/2007 | de La Chapelle | H04L 1/0002 370/328 |
| 2007/0253503 A1 | 11/2007 | Kim et al. | |
| 2007/0258511 A1 | 11/2007 | Knight et al. | |
| 2008/0273636 A1 | 11/2008 | Zhu et al. | |
| 2010/0172446 A1 | 7/2010 | Popoli | |
| 2011/0007646 A1 | 1/2011 | Miller et al. | |
| 2011/0009055 A1* | 1/2011 | Miller | H04B 7/18513 455/9 |
| 2011/0085589 A1* | 4/2011 | Filipovic | H04J 11/0083 375/224 |

* cited by examiner

INROUTE AUTOMATIC GAIN CONTROL DETECTION OF OUTROUTE INTERFERENCE

FIELD OF THE INVENTION

The invention relates to minimizing an impact of noise floor variations and expanding a dynamic range on inroutes in a satellite communication system. In particular, the invention relates to minimizing an impact of noise floor variations, mainly caused by, but not limited to, self-interference effects of a satellite gateway's forward link transmissions in a Ka band spot beam satellite system, and further relates to expanding the dynamic range of the Ka band spot beam satellite system based on biasing automatic gain control estimates on each inroute according to a respective code rate of each received burst.

BACKGROUND

Ka spot beam satellite systems and inroute links are subject to noise floor variations as a function of frequency. The variations are mainly due, but not limited to, self-interference effects caused by a satellite gateway's outroute transmissions. The inroute noise floor spectrum has pedestal and valley-like variations over a frequency range. Satellite terminals that range in areas having a relatively low noise floor may not have sufficient energy to establish a link on an inroute in areas having a relatively high noise floor. If a link can be established, errors may occur during a time interval in which a satellite terminal is adjusting its power level.

Automatic gain control subsystems typically compute received power on a continuous burst-by-burst basis without any distinction as to underlying signal characteristics such as, for example, an operating code rate. Transmit power is proportional to the code rate. Consequently, averaging received power levels forces the automatic gain control subsystems to settle to an automatic gain control value proportional to a distribution of inroutes with varying code rates. When most inroutes are operating in clear sky conditions, the automatic gain control value will settle to a highest code rate power level. Centering the automatic gain control value at the highest code rate power level negatively affects inroute bursts received in a faded condition at lower code rates. As an example, if the automatic gain control value for an inroute settled to a power value associated with a code rate of 9/10, a burst received at a code rate of 1/2 would experience packet loss and degradation due to a limited dynamic range of a demodulator.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In a first aspect of the invention, a machine-implemented method is provided for minimizing the impact of noise floor variations in a Ka band spot beam satellite system. A channelizer of a satellite gateway demodulator may receive digitized signals for multiple channels. For each of the received digital signals, a respective automatic gain control component adjusts the received power level of a respective digitized signal to produce a respective automatic gain controlled digitized signal. The respective automatic gain control component is associated with a respective channel on which a corresponding analog signal was received. The respective automatic gain controlled digital signal may be downconverted to produce a respective downconverted signal. The respective downconverted signal may then be provided to a burst processor component of the demodulator. The burst processor component may determine an automatic gain control estimate for the respective downconverted signal, and may provide the automatic gain control estimate and channel information of the respective channel to a processor component, which determines an average automatic gain control value for the respective channel, based on the automatic gain control estimates for the respective channel, and provides the average automatic gain control value to the respective automatic gain control component of the channelizer within the satellite gateway.

In a second aspect of the invention, a machine-implemented method for expanding the dynamic range in a Ka band spot beam satellite system is provided. Multiple digitized signals for multiple inroutes may be received by at least one automatic gain control component of a satellite gateway demodulator. For each of the received digitized signals, automatic gain control is performed, by the at least one automatic gain control component, on a respective digitized signal to produce a respective automatic gain controlled digitized signal. The respective automatic gain controlled digitized signal may be downconverted to produce a respective downconverted signal. The respective downconverted signal may be provided to a burst processor component of the demodulator. The burst processor component may determine an automatic gain control estimate for the respective downconverted signal, may obtain a code rate associated with the respective downconverted signal, and may provide the code rate and the automatic gain control estimate associated with the respective downconverted signal to a processor component of the satellite gateway. The processor component may calculate average automatic gain control values based on the determined automatic gain control estimates and a non-zero fixed bias associated with the corresponding code rate in order to maximize the demodulator dynamic range, and may provide at least one automatic gain control reference to the at least one automatic gain control component to affect the automatic gain control performed by the at least one automatic gain control component. The at least one automatic gain control reference is based on the average automatic gain control value associated with multiple downconverted signals.

In a third aspect of the invention, a method is provided for a satellite terminal served by a satellite gateway that periodically advertises automatically generated noise floor information of multiple channels. The satellite terminal may periodically receive the advertised automatically generated noise floor information from the satellite gateway. The satellite terminal may periodically transmit data to the satellite gateway, an amount of power used by the satellite terminal transmitting the data is based on a latest of the periodically received advertised automatically generated noise floor information.

In a fourth aspect of the invention, a satellite gateway is provided. The satellite gateway may include a processor component, a burst processor, and a channelizer for receiving digitized signals. The channelizer may include multiple channelizer automatic gain control components, multiple down converters, and a multiplexer. Each of the multiple channelizer automatic gain control components may adjust the received power level of digitized signals associated with a respective channel in order to produce a respective automatic gain controlled digitized signal. Each of the multiple down converters may be connected to a respective channelizer automatic gain control component and may be arranged to downconvert the respective automatic gain controlled digitized signal to produce a respective downconverted digitized signal. A multiplexer may be arranged to receive each of the respective downconverted digitized signals and may provide each of the respective downconverted signals to the burst processor component. The burst processor component includes a demodulator automatic gain control estimator, a demodulator automatic gain control component, and a carrier recovery loop component. The demodulator automatic gain control estimator may receive each of the respective downconverted signals, one at a time, and may produce a corresponding demodulator automatic gain control estimate. The demodulator carrier recovery loop component may receive the respective automatic gain controlled downconverted signal from the demodulator automatic gain control component and may produce respective demodulated data and respective burst information. The processor component may receive the corresponding demodulator automatic gain control estimates from the demodulator automatic gain control estimator, the demodulated data and the burst information from the demodulator carrier recovery component, and may periodically provide automatic gain control reference values to respective channelizer automatic gain control components. Each of the automatic gain control reference values are related to the automatic gain control estimates for a respective inroute.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Noise and Interference

Figure 1:
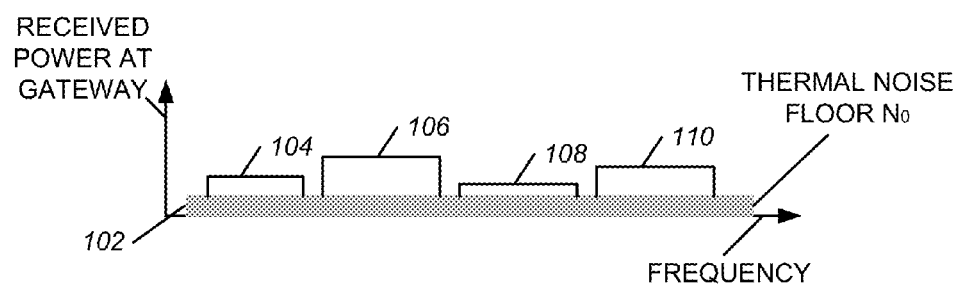
FIG. 1 illustrates an exemplary noise floor in a Ka band spot beam satellite system.

Inroute links in a Ka band spot beam satellite system are subject to noise variation as a function of frequency. FIG. 1 illustrates an exemplary noise floor in a Ka band spot beam satellite system. An abscissa, or horizontal coordinate, represents received inroute signals at various frequencies and an ordinate, or vertical coordinate, represents a corresponding amount of power received at a satellite gateway at each inroute frequency. A thermal noise floor $N_0$ 102 is generally flat. Signals 104, 106, 108, 110 represent various amounts of power used to maintain the desired satellite link performance. In general, with a flat thermal noise profile and a fixed rain fade attenuation value, the received power required varies only due to the transmission symbol rate and FEC rate, and does not vary with inroute frequency.

Figure 2:
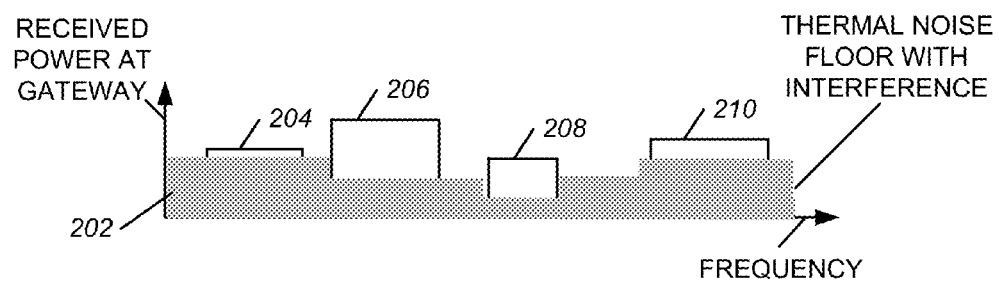
FIG. 2 shows an effect of interference caused by outroute transmissions in a Ka band spot beam satellite system.

FIG. 2, which has a same abscissa and a same ordinate as in FIG. 1, shows a typical Ka band spot beam satellite system noise floor 202 due to self-interference. As can be seen in FIG. 2, noise floor 202 is not flat, and signals 204, 206, 208, 210 are received at varying noise floor levels.

Prior Art Demodulator and Processor Component

Figure 3:
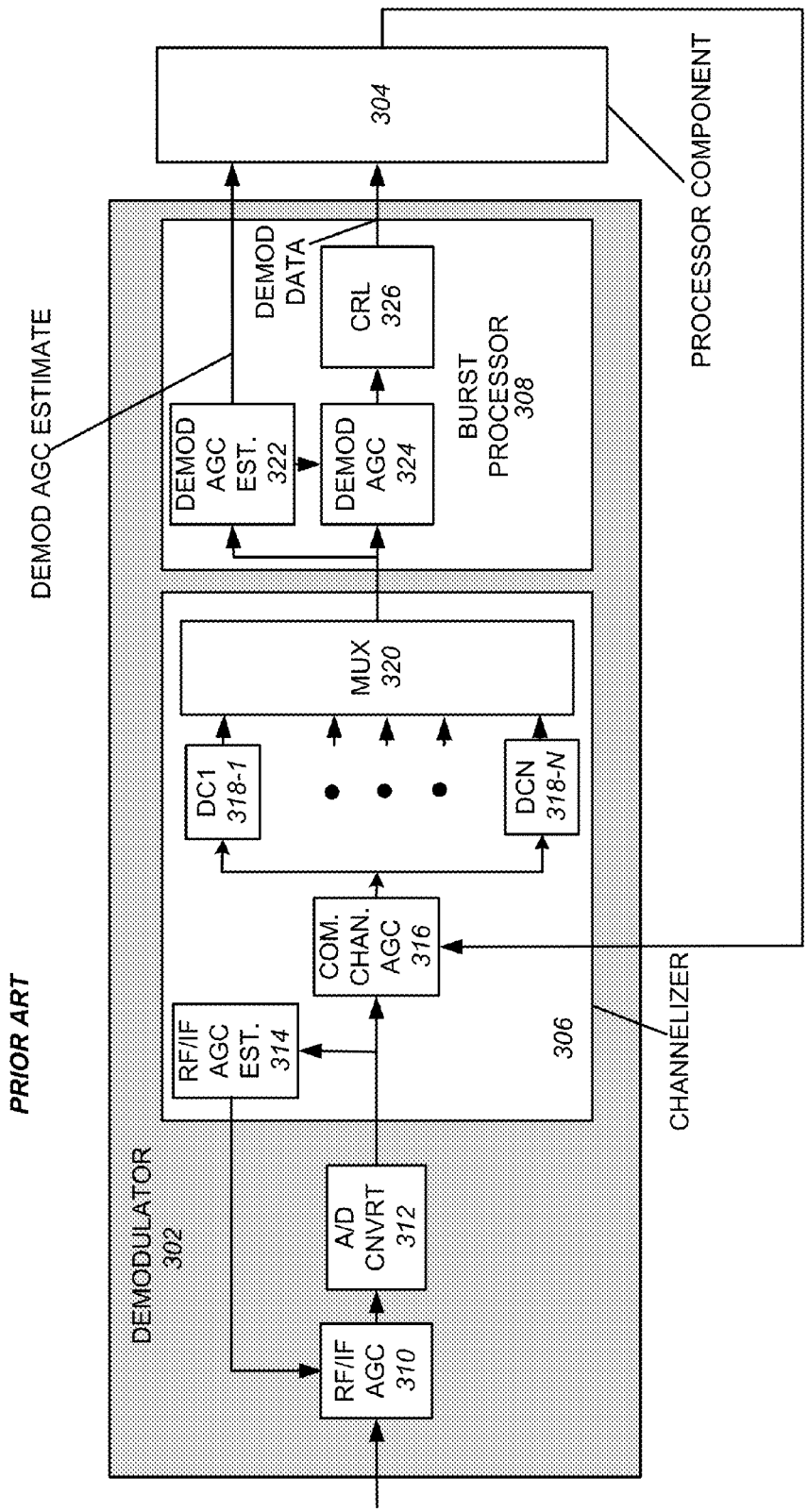
FIG. 3 shows a portion of a processor component and a demodulator, which includes a channelizer and a burst processor, in an existing system.

FIG. 3 illustrates a portion of a demodulator 302 and a processor component 304 of an existing satellite gateway. Demodulator 302 may include a channelizer 306 and a burst processor 308, as well as a radio frequency/intermediate frequency automatic gain control component (RF/IF AGC) 310 and an analog-to-digital (A/D) converter 312. A received radio frequency or intermediate frequency analog signal may be provided to demodulator 302. RF/IF AGC component 310 may perform automatic gain control on the received analog signal to produce an automatic gain controlled signal, which may be provided to A/D converter 312 to produce a digitized signal. The digitized signal may then be provided to channelizer 306.

Channelizer 306 may include a radio frequency or intermediate frequency automatic gain control estimator (RF/IF AGC estimator) 314, a common channel automatic gain control (AGC) component 316, down converter components 1 through N, where N is a number of channels or inroutes, and a multiplexer 320.

RF/IF AGC estimator 314 and common channel AGC 316 both may receive the digitized signal from A/D converter 312. RF/IF AGC estimator 314 may estimate a value of automatic gain control from the received digitized signal and may provide the estimated value to RF/IF AGC component 310 as an automatic gain control (AGC) reference. Common channel AGC component 316 may perform automatic gain control on the received digitized signal to produce an automatic gain controlled digitized signal, which may be provided to one of down converters 1 through N (318-A to 318-N) based on an inroute on which the corresponding analog signal was received. Processor component 304 may provide an AGC reference to common channel AGC component 316, as will be discussed later.

Each of down converters 1 through N (318-A to 318-N) may receive a respective automatic gain controlled digital signal from common channelizer AGC component 316 and may downconvert the respective automatic gain controlled digital signal to produce a respective downconverted signal, which may be provided to multiplexer 320. Multiplexer 320 may then provide the respective downconverted signals to burst processor 308.

Burst processor 308 may include a demodulator AGC estimator component 322, a demodulator AGC component 324, and a carrier recovery loop (CRL) component 326.

Demodulator AGC estimator component 322 and demodulator AGC component 324 may receive each respective downconverted signal from multiplexer 320. Demodulator AGC estimator component 322 may estimate an AGC value based on the received respective downconverted signal, may provide the estimated AGC value to processor component 304 and may provide the estimated AGC value to demodulator AGC component 324 as an AGC reference for demodulator AGC component 324.

Figure 5:
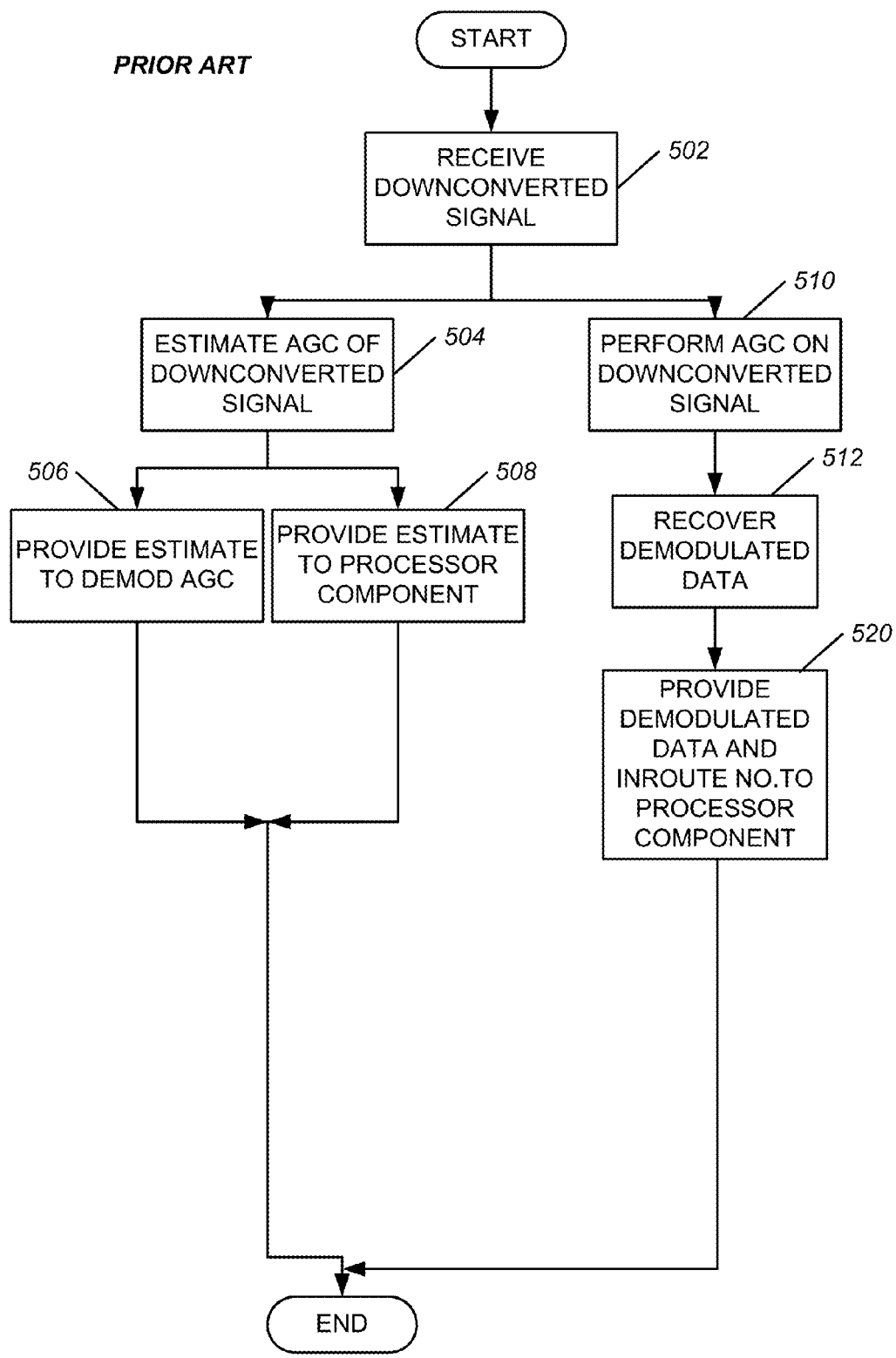
FIG. 5 illustrates an exemplary process that may be performed in various embodiments of a burst processor.

FIG. 5 illustrates an exemplary process performed by burst processor 308 in various embodiments. First, burst processor 308 receives a respective downconverted signal (act 502). Demodulator AGC component 324 may perform automatic gain control on the received respective downconverted signal and may produce and provide a respective downconverted automatic gain controlled signal to CRL component 326 (act 510). CRL component 326 may recover demodulated data and additional descriptive burst information in a form of a data header packet from the respective downconverted automatic gain controlled signal (act 512) and may provide the demodulated data and the burst information to processor component 304 (act 520). The burst information may include an inroute number, as well as other information including, but not limited to a code rate.

Demodulator AGC estimator component 322 may estimate an AGC value from the received downconverted signal (act 504) and may provide the estimated AGC value to demodulator AGC component 324 to use as an AGC reference value (act 506). Demodulator AGC estimator component 322 may further provide the estimated AGC value to processor component 304 (act 508).

Processor component 304 may include a processor for executing instructions stored in a memory, which may include volatile memory and/or non-volatile memory. When processor 304 executes the instructions, a method may be performed.

Processor component 304 may receive and store, for each burst, the received AGC estimated value from demodulator AGC estimator component 322, and the demodulated data including the burst information from CRL component 326. Processor component 304 may calculate an average received AGC value from the AGC estimated values received during a predetermined time period. The average received AGC value may be provided by processor component 304 to common channelizer AGC component 316 as an AGC reference value. The average received AGC value may be calculated by processor component 304 based on bursts received across all inroutes and all code rates. Processor component 304 may provide an updated average received AGC value to common channelizer AGC component 316 as an updated AGC reference value.

Figure 4:
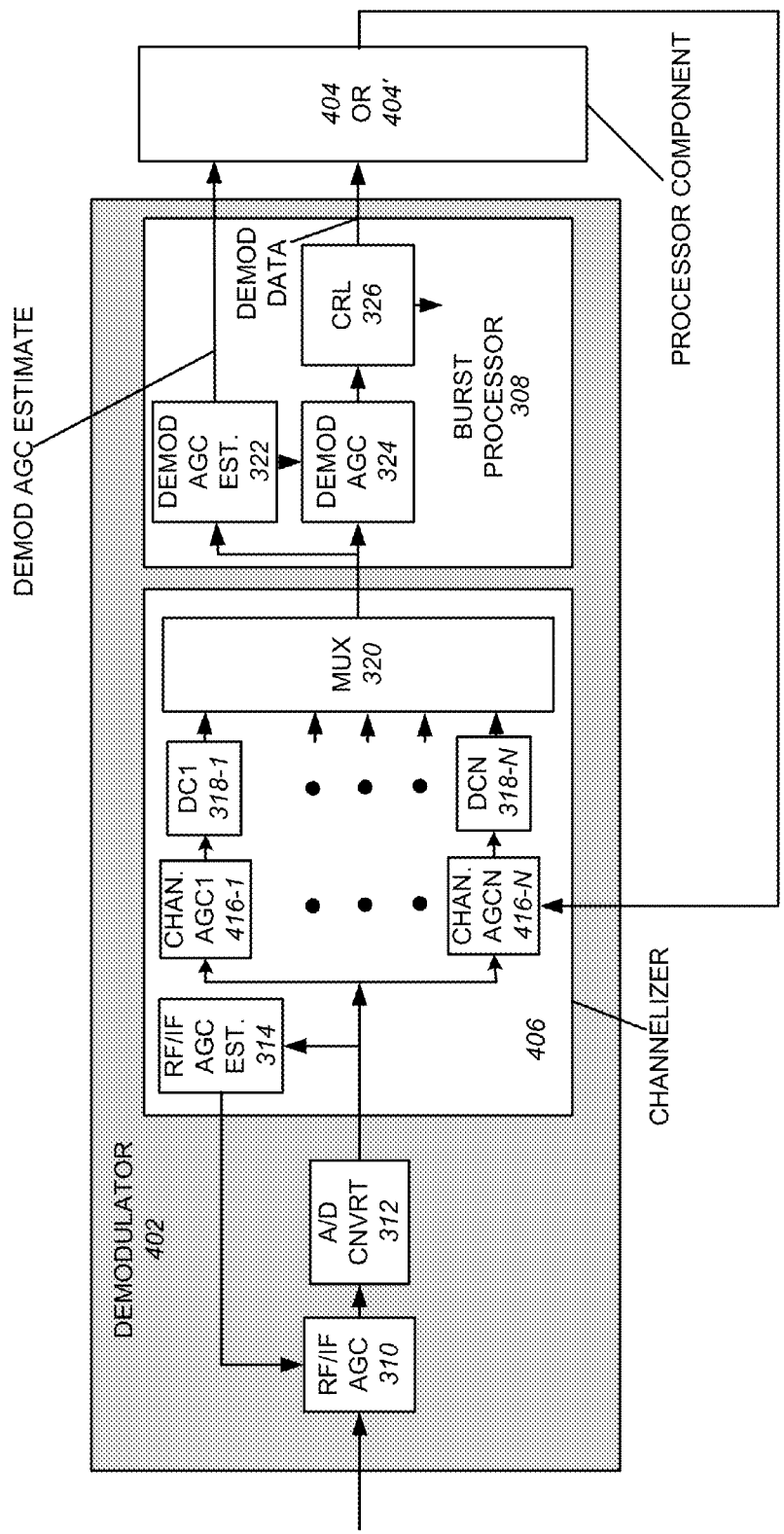
FIG. 4 shows a portion of a processor component and a demodulator, which includes a channelizer and a burst processor, in an exemplary satellite gateway consistent with embodiments of the invention.

Exemplary Demodulator and Processor Component Consistent with Embodiments of the Invention FIG. 4 illustrates a portion of a demodulator 402 and a processor component 404 of an exemplary satellite gateway consistent with embodiments of the invention. Reference numerals identical to those of FIG. 3 indicate identical components and will not be further discussed.

Demodulator 402 may include a channelizer 406 and burst processor 308, as well as radio frequency/intermediate frequency automatic gain control component (RF/IF AGC) 310 and analog-to-digital (A/D) converter 312.

Channelizer 406 may include radio frequency or intermediate frequency automatic gain control estimator (RF/IF AGC estimator) 314, channelizer automatic gain control (AGC) components 1 to N (416-1 through 416-N) and down converter components 1 to N (318-1 through 318-N), where N is a number of channels or inroutes, and multiplexer 320.

Each of channelizer AGC components 1 to N (416-1 through 416-N) corresponds to a respective inroute and may perform automatic gain control on a digitized signal associated with the respective inroute to produce a respective automatic gain controlled digitized signal, which may be provided to a respective down converter of down converters 1 to N (318-1 through 318-N) based on an inroute on which the signal was received. Processor component 404 may provide AGC references to respective channelizer AGC components (416-1 through 416-N), as will be discussed later.

Figure 6:
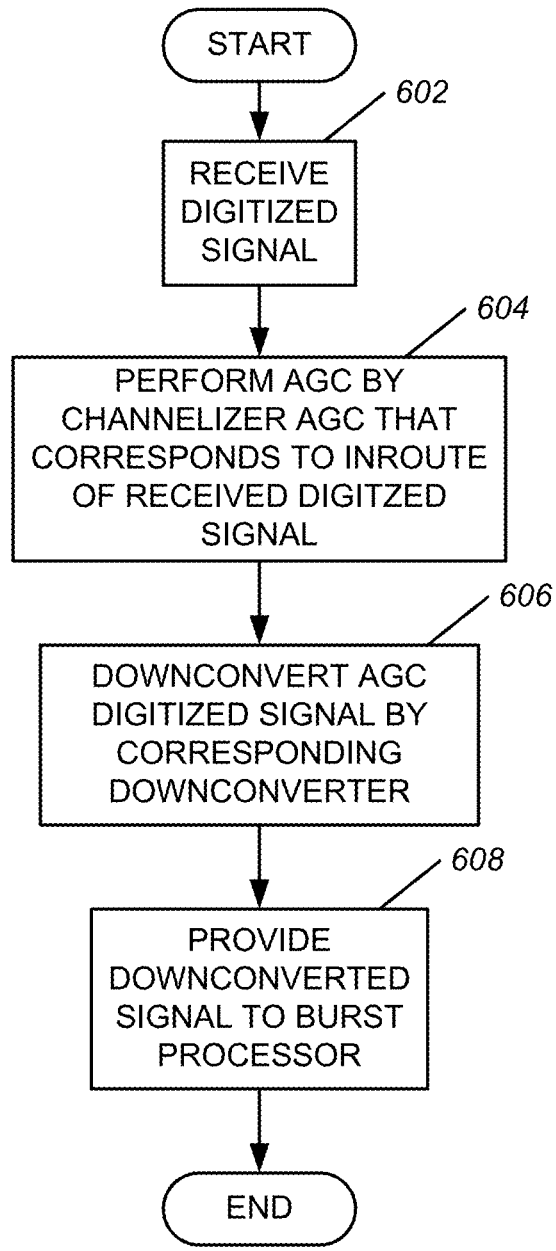
FIG. 6 illustrates an exemplary process performed by a channelizer consistent with embodiments of the invention.

FIG. 6 illustrates an exemplary process, performed by channelizer 406 when receiving a digitized signal. The process may begin with channelizer 406 receiving the digitized signal (act 602). A channelizer AGC component, of channelizer AGC components 1 to N (318-1 through 318-N), associated with an inroute on which an analog signal, corresponding to the received digitized signal was received, performs automatic gain control to produce an automatic gain controlled signal (act 604). Next, one of down converters 1-N (318-1 through 318-N), associated with the channelizer AGC component, receives the automatic gain controlled signal and downconverts the automatic gain control signal to produce a downconverted signal (act 606). The downconverted signal may then be provided to burst processor 308 via multiplexer 320 (act 608).

Processor component 404 may include a processor for executing instructions stored in a memory, which may include volatile memory and/or non-volatile memory. When processor 404 executes the instructions, a method may be performed. In other embodiments, processor component 404 may include an application specific integrated circuit (ASIC) or a field programmable gate array (FPGA).

Processor component 404 may receive and store, for each burst, the received AGC estimated value from demodulator AGC estimator component 322, the demodulated data and the burst information including, but not limited to, inroute number and code rate, from CRL component 326.

Figure 7:
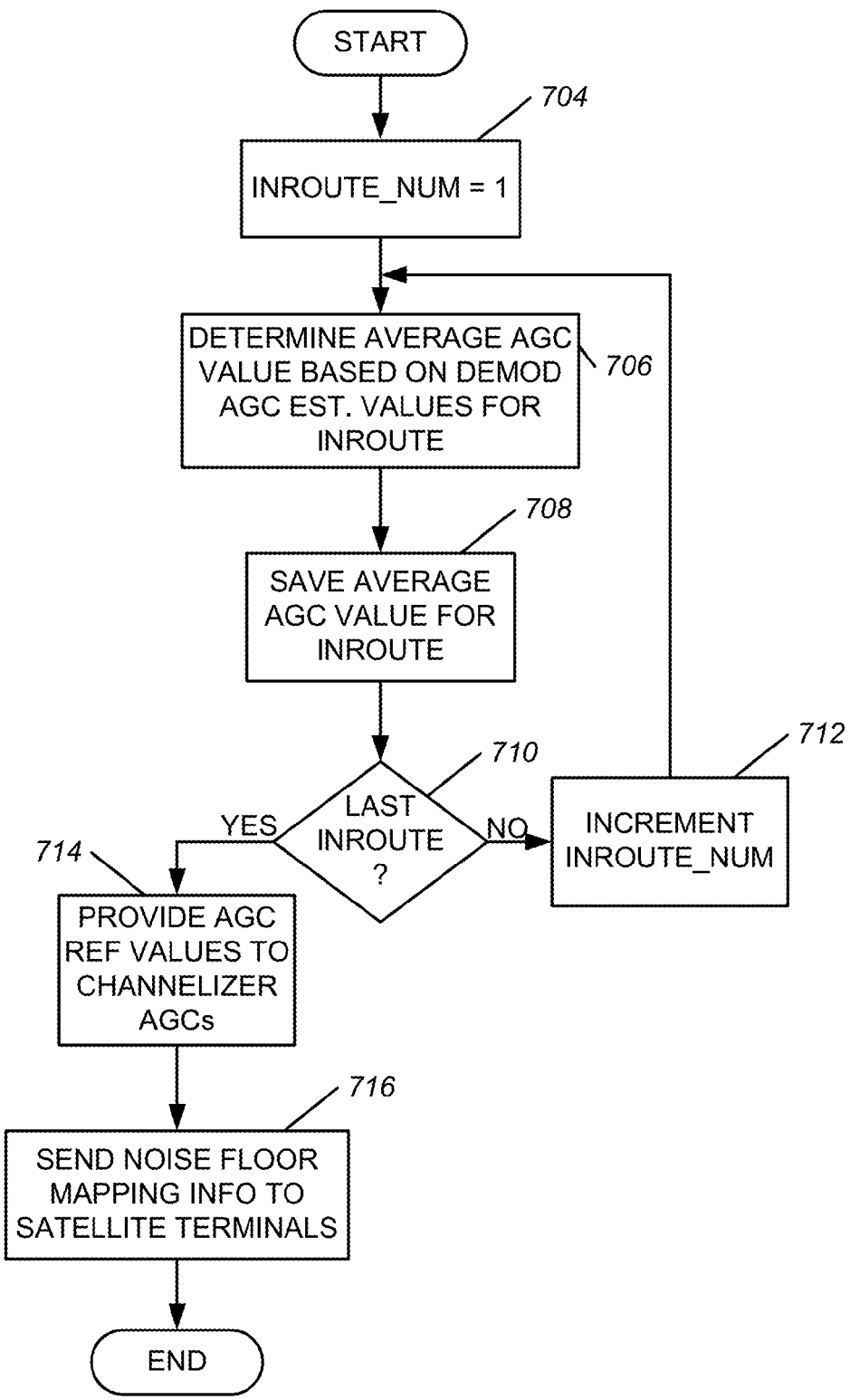
FIG. 7 is a flowchart for explaining an exemplary process that may be performed in an embodiment of a processor component.

FIG. 7 illustrates an exemplary process that may be performed by processor component 404. Processor component 404 may calculate an average AGC value for each inroute based on the AGC estimated values received. Processor component 404 may begin with inroute 1 (act 704), may determine an average AGC value based on the demodulator AGC estimates for the inroute (act 706), and may save the average AGC value (act 708). If processor component 404 has not processed a last inroute (act 710) then processor component 404 may increment an inroute number to prepare to process a next inroute (act 712). Processor component 404 may then repeat acts 706-708. If, during act 710, processor component 404 determines that average AGC values for all inroutes have been calculated, then processor component 404 may provide the average AGC values for all inroutes to respective channelizer AGC components (416-1 through 416-N) as AGC reference values (act 714). Processor component 404 may then provide the AGC reference values as a noise floor map to satellite terminals served by the satellite gateway (act 716). The process may then be completed.

As illustrated by the exemplary process of FIG. 7, the average received AGC estimate value for each inroute may be calculated by processor component 404 and may be provided to the respective channelizer AGC component (416-1 through 416-N) as the respective AGC reference value. Processor component 404 may calculate the respective average AGC estimate value based on bursts received for each respective inroute regardless of code rates. Processor component 404 may provide updated average AGC estimate values to respective channelizer AGC components (416-1 through 416-N) as AGC reference values are updated.

Differences among AGC reference values for different inroutes provide an indication of noise floor variation and position. Processor component 404 may advertise a noise floor map to satellite terminals served by the satellite gateway based on the differences among the AGC reference values for different inroutes. The advertised noise floor map may be sent to the satellite terminals periodically. The satellite terminals, served by the satellite gateway, may receive and store the noise floor map and when each satellite terminal transmits, only an amount of power required for a particular code rate operating point is used, taking the noise floor map into consideration.

Second Processor Component Embodiment

Figure 8:
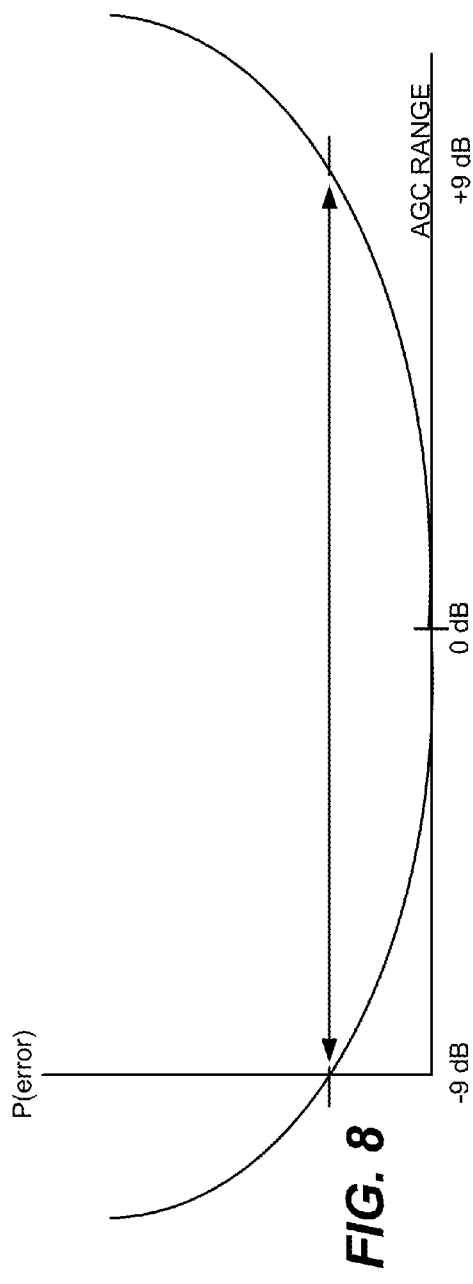
FIG. 8 illustrates a dynamic range plot of an exemplary satellite gateway demodulator.

A demodulator has a finite burst-to-burst dynamic range. FIG. 8 illustrates an exemplary demodulator's dynamic range. AGC range is represented along an abscissa of FIG. 8 and the demodulator's probability of error performance, P(error), is represented along an ordinate of FIG. 8. As FIG. 8 shows, the dynamic range of the exemplary demodulator is from −9 dB to +9 dB before demodulator error rates grow excessively.

In a second embodiment of a processor component, a processor component 404' may receive and store, for each burst, the received AGC estimated value from demodulator AGC estimator component 322, and the demodulated data including burst header information from CRL component 326.

Figure 9:
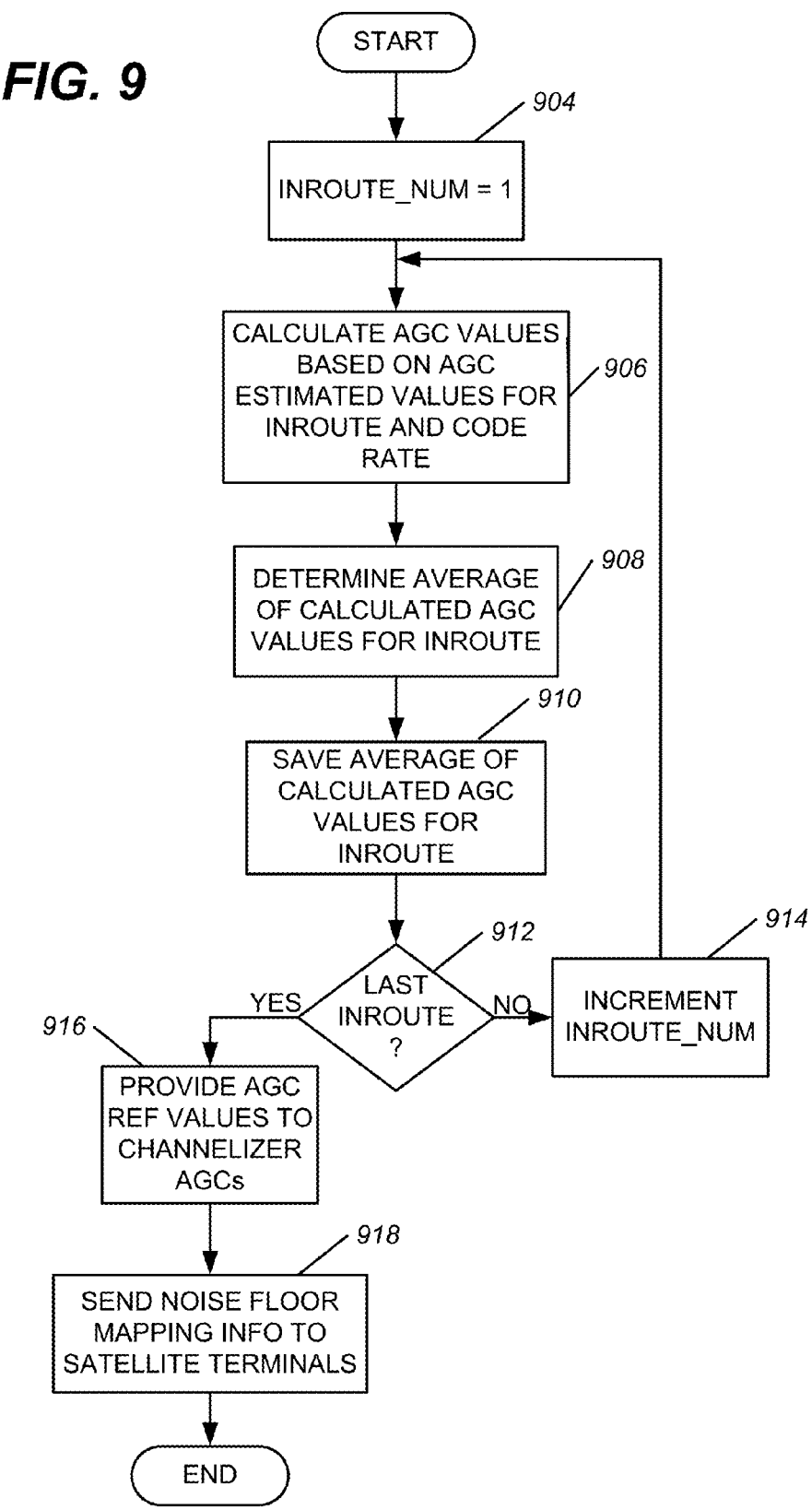
FIG. 9 illustrates an exemplary process that may be performed by a second embodiment of a processor component.

FIG. 9 illustrates an exemplary process that may be performed by processor component 404'. The process may begin with inroute 1 (act 904). Processor component 404' may calculate an AGC value for each burst received on an inroute based on a difference between each respective AGC estimated value received and a respective fixed non-zero bias value associated with a corresponding burst code rate (act 906). The processor component may then calculate the average AGC value for the inroute by averaging the calculated AGC values for bursts received on the inroute and saving the averaged AGC value for the inroute (act 910). In one exemplary embodiment the fixed non-zero bias value for code rates 1/2, 2/3, 4/5, and 9/10, respectively, may be −2.5 dB, −1.25 dB, +1.25 dB, and +2.5 dB. In other embodiments, different biases may be used for different or additional code rates.

Processor component 404' may then determine whether a last inroute was processed (act 912). If the last inroute was not processed, then an inroute number is incremented to prepare to process a next inroute (act 914) and acts 906-914 may be repeated.

If, during act 912, processor component 404' determines that the last inroute was processed, then processor component 404' may provide the saved average calculated AGC value for each inroute to a respective channelizer AGC component (416-1 through 416-N) as respective AGC reference values (act 916). Processor component 404' may then send noise floor mapping information, based on the respective AGC reference values, to satellite terminals served by the satellite gateway (act 918). The respective average calculated AGC estimate values may be calculated by processor component 404' based on bursts received for each respective inroute. After performing act 918, the process may be completed.

Differences among AGC reference values for different inroutes provide an indication of noise floor variation and position. As previously mentioned, processor component 404' may advertise a noise floor map to satellite terminals served by the satellite gateway based on the differences among the AGC reference values for different inroutes. The advertised noise floor map may be sent to the satellite terminals periodically. The satellite terminals may transmit at only an amount of power required for a particular code rate operating point.

Figure 10:
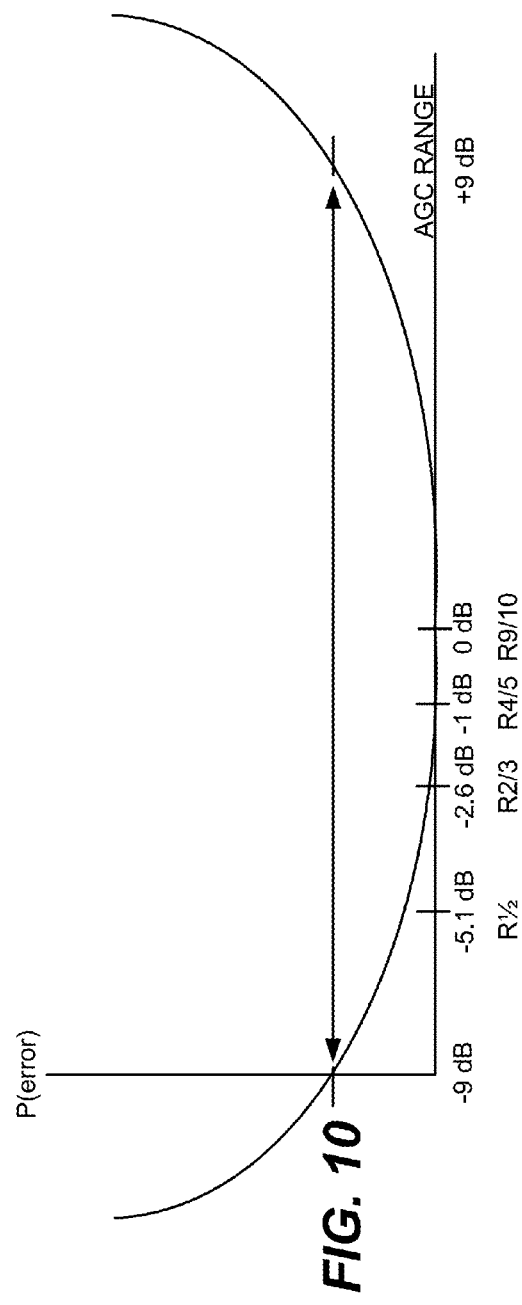
FIG. 10 illustrates the automatic gain control converging to a power level when a majority of bursts are received during a clear sky condition, at a high code rate.

If a majority of received bursts are received during a clear sky condition at a code rate of 9/10, automatic gain control will converge to a higher level than if the majority of the bursts are at a lower code rate such as, for example, 1/2. This is shown in FIG. 10 in which the majority of the received bursts have a code rate of 9/10. As shown, bursts received with the code rate of 9/10 are centered to be in a middle of the dynamic range.

Figure 11:
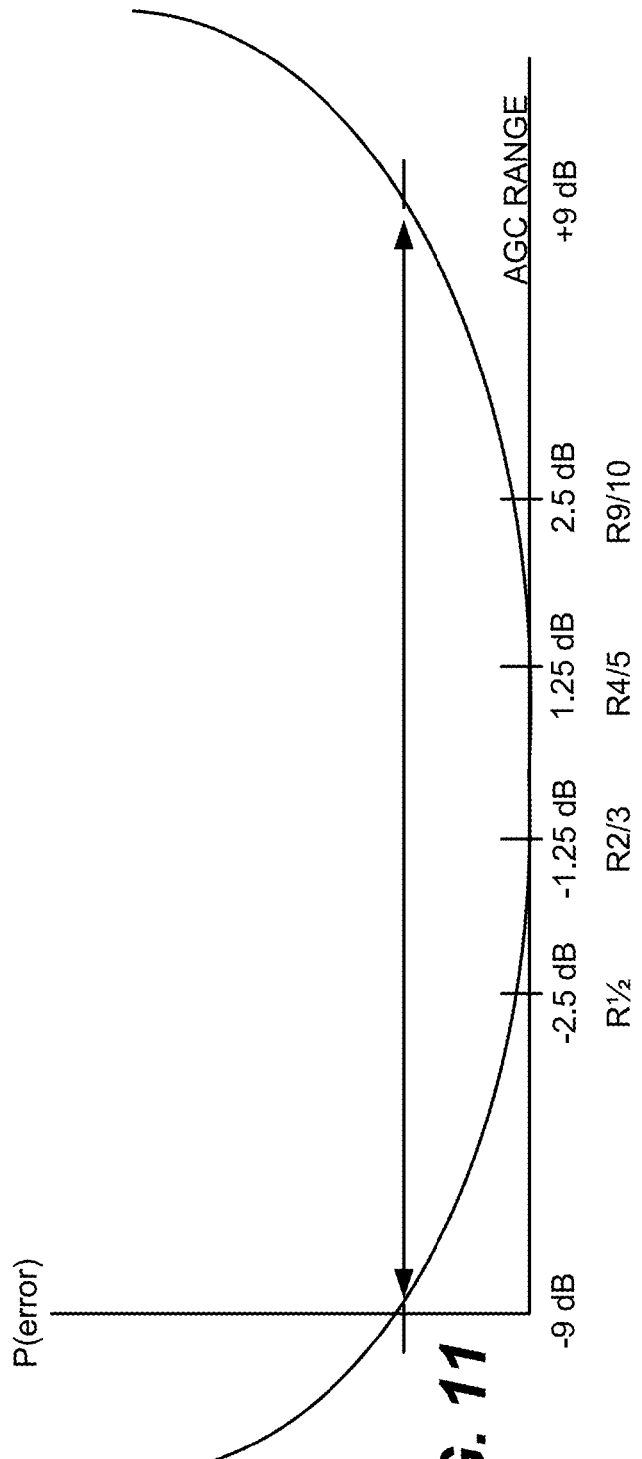
FIG. 11 shows that, when code rate is taken into account in the second embodiment of the processor component, the automatic gain control will converge to a power level corresponding to a midpoint of all received bursts, independent of code rate.

When the code rate is taken into account, as it is in processor component 404', automatic gain control will converge such that a middle code rate may be in an approximate central portion of the dynamic range, as shown in FIG. 11.

CONCLUSION

Various embodiments have been described in this specification. Different combinations of the various embodiments are also included within the scope of this disclosure. For example, channelizer 406 may be implemented with either processor component 404, with no code rate biasing of AGC values, or processor component 404', with code rate biasing of AGC values.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown.

We claim as our invention:

1. A machine-implemented method of minimizing an impact of a noise floor variation in a Ka band spot beam satellite system, the machine-implemented method comprising:

receiving, by a channelizer of a demodulator included in a satellite gateway, digitized signals for a plurality of channels;

for each of the received digitized signals:
performing automatic gain control on a respective digitized signal to produce a respective automatic gain controlled digitized signal, the automatic gain control for the signal being performed by an automatic gain control component of a plurality of automatic gain control components, the automatic gain control component being associated with a respective channel that is associated with the respective digitized signal;

downconverting the respective automatic gain controlled digitized signal to produce a respective downconverted signal;

providing the respective downconverted signal to a burst processor component of the demodulator, the burst processor component performing:
determining an automatic gain control estimate for the respective downconverted signal,
providing the automatic gain control estimate to a processor component of the satellite gateway,
performing a second automatic gain control to the respective downconverted signal, based on the automatic gain control estimate, to produce a respective automatic gain controlled downconverted signal,
recovering respective demodulated data and burst information from the respective automatic gain controlled downconverted signal, the burst information including channel information, and
providing the respective demodulated data and the burst information to the processor component;

maintaining, by the processor component, a plurality of automatic gain control references for the plurality of channels based on automatic gain control estimates associated with the plurality of channels, the maintaining further comprising:
obtaining a code rate from the burst information associated with a corresponding automatic gain control estimate, and
calculating an automatic gain control value based on the corresponding automatic gain control estimate and a fixed non-zero bias value, associated with the obtained code rate, in order to maximize a dynamic range of the respective channel; and providing each of the plurality of automatic gain control references to respective corresponding automatic gain control components of the plurality of automatic gain control components to affect the automatic gain control performed by the respective corresponding automatic gain control components.

2. The machine-implemented method of claim 1, further comprising:
periodically sending, to a plurality of satellite terminals, noise floor information based on information related to the plurality of automatic gain control references.

3. The machine-implemented method of claim 1, further comprising:
averaging, by the processor component, values based on each of the plurality of automatic gain control estimates of each of the plurality of channels to produce a respective average value for each of the plurality of channels, each of the plurality of automatic gain control references being related to the respective average value for a respective channel of the plurality of channels.

4. The machine-implemented method of claim 1, wherein the calculated automatic gain control value is greater than the corresponding automatic gain control estimate.

5. The machine-implemented method of claim 1, further comprising:
averaging, by the processor component, calculated automatic gain control values associated with each inroute of a plurality of inroutes to produce a respective average automatic gain control value for each of the plurality of inroutes, each of the plurality of automatic gain control references being related to the respective average automatic gain control value associated with a respective inroute of the plurality of inroutes.

6. A machine-implemented method for expanding a dynamic range in a Ka band spot beam satellite system, the machine-implemented method comprising:

receiving, by at least one automatic gain control component of a channelizer of a satellite gateway, a plurality of digitized signals associated with a plurality of inroutes;

for each of the received plurality of digitized signals:
performing, by the at least one automatic gain control component, automatic gain control on a respective digitized signal to produce a respective automatic gain controlled digitized signal,
downconverting the respective automatic gain controlled digitized signal to produce a respective downconverted signal;
providing the respective downconverted signal to a burst processor component, the burst processor component performing:
determining an automatic gain control estimate for the respective downconverted signal,
obtaining a code rate associated with the respective downconverted signal; and
providing the automatic gain control estimate and the code rate associated with the respective downconverted signal to a processor component of the satellite gateway; and the processor component performing:
calculating an automatic gain control value based on the automatic gain control estimate and a non-zero fixed bias associated with the obtained code rate, in order to maximize a dynamic range associated with the respective downconverted signal, and
providing, by the processor component, at least one automatic gain control reference to the at least one automatic gain control component to affect the automatic gain control performed by the at least one automatic gain control component, the at least one automatic gain control reference being based on calculated automatic gain control values associated with a plurality of downconverted signals.

7. The machine-implemented method of claim 6, further comprising:
averaging, by the processor component, the calculated automatic gain control values to produce a respective average automatic gain control value, the at least one automatic gain control reference being based on the respective average automatic gain control value.

8. The machine-implemented method of claim 6, wherein:
the at least one automatic gain control component of the demodulator includes a plurality of automatic gain control components, each of the plurality of automatic gain control components being associated with a respective inroute of the plurality of inroutes,
the performing automatic gain control on a respective digitized signal further comprises:
performing, by a respective automatic gain control component of the plurality of automatic gain control components, automatic gain control on the respective digitized signal to produce a respective automatic gain controlled digitized signal, the respective automatic gain control component being associated with the respective inroute associated with the respective digitized signal; and
the providing at least one automatic gain control reference to the at least one automatic gain control component further comprises:
providing each of a plurality of respective automatic gain control references to a respective automatic gain control component of the plurality of automatic gain control components, each of the plurality of automatic gain control components being associated with a respective different inroute of the plurality of inroutes.

9. The machine-implemented method of claim 8, further comprising:
maintaining, by the processor component, the plurality of automatic gain control references, each of the plurality of respective automatic gain control references being associated with a respective different inroute of the plurality of inroutes and being based on the calculated automatic gain control values associated with the respective inroute of the plurality of inroutes.

10. The machine-implemented method of claim 9, further comprising:
providing the plurality of respective automatic gain control references to at least one satellite terminal served by the satellite gateway.

11. The machine-implemented method of claim 10, wherein the providing the plurality of respective automatic gain control references is periodically provided to the at least one satellite terminal.

12. The machine-implemented method of claim 6, wherein the burst processor component further performs:
performing a second automatic gain control to the respective downconverted signal, based on the automatic gain control estimate for the respective downconverted signal, to produce a respective automatic gain controlled downconverted signal;
recovering respective demodulated data and respective burst information from the respective automatic gain controlled downconverted signal, the burst information including the code rate; and
providing the respective demodulated data and the code rate to the processor component.

13. The machine-implemented method of claim 6, wherein the calculated automatic gain control value is greater than the automatic gain control estimate.

14. The machine-implemented method of claim 6, wherein the calculated automatic gain control values forces an automatic gain control operating point to a respective specific point for each respective code rate associated with the each respective digitized signal.

15. A satellite gateway comprising:
a processor component;
a burst processor; and
a channelizer for receiving a plurality of digitized signals, the channelizer comprising:
a plurality of channelizer automatic gain control components, each of the plurality of channelizer automatic gain control components being for performing automatic gain control on digitized signals of the plurality of digitized signals associated with a respective channel of a plurality of channels in order to produce a respective automatic gain controlled digitized signal,
a plurality of down converters, each of the plurality of down converters being connected to a respective channelizer automatic gain control component and arranged to downconvert the respective automatic gain controlled digitized signal to produce a respective downconverted digitized signal, and
a multiplexer arranged to receive each of the respective downconverted digitized signals and provide each of the respective downconverted signals to the burst processor component;
wherein:
the burst processor component comprises:
an automatic gain control estimator to receive each of the respective downconverted signals, one at a time, and produce a corresponding automatic gain control estimate,
a demodulator automatic gain control component to receive the respective downconverted signals, one at a time, and the corresponding automatic gain control estimate from the automatic gain control estimator to produce a respective automatic gain controlled downconverted signal, and
a carrier recovery loop component to receive the respective automatic gain controlled downconverted signal from the demodulator automatic gain control component and produce respective demodulated data and respective burst information; and
the processor component is arranged to:
receive the corresponding automatic gain control estimates from the automatic gain control estimator and the corresponding demodulated data and burst information from the recovery component, each of the corresponding burst information including an inroute number and a code rate,
calculate each respective automatic gain control value based on a respective one of the corresponding automatic gain control estimates and a fixed non-zero bias associated with the code rate of a respective one of the corresponding burst information,
average values from respective calculated automatic gain control values for each respective inroute of a plurality of inroutes to produce the automatic gain control reference values for each of the respective inroutes of the plurality of inroutes, and
periodically provide the automatic gain control reference values to respective channelizer automatic gain control components of the plurality of channelizer automatic gain control components, each of the automatic gain control reference values being related to the automatic gain control estimates for the respective inroute of the plurality of inroutes.

16. The satellite gateway of claim 15, wherein the processor component is further arranged to cause noise floor information, based on the automatic gain control reference values, to be periodically transmitted to at least one satellite terminal served by the satellite gateway.

* * * * *